(12) United States Patent
Goichberg (10) Patent No.: US 11,251,826 B2
(45) Date of Patent: Feb. 15, 2022

(54) CABLE MODEM, APPARATUS, DEVICE AND METHOD FOR A CABLE MODEM, APPARATUS, DEVICE AND METHOD FOR A CABLE COMMUNICATION SYSTEM

(71) Applicant: Intel Corporation, Santa Clara, CA (US)

(72) Inventor: Nathan Goichberg, Ashdod (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/124,612

(22) Filed: Dec. 17, 2020

(65) Prior Publication Data

US 2021/0306023 A1 Sep. 30, 2021

(30) Foreign Application Priority Data

Mar. 27, 2020 (EP) ..................................... 20166217

(51) Int. Cl.
*H04B 1/40* (2015.01)
*H04B 17/318* (2015.01)

(52) U.S. Cl.
CPC ............. *H04B 1/40* (2013.01); *H04B 17/318* (2015.01)

(58) Field of Classification Search
CPC ......... H04L 1/24; H04L 1/0026; Y02D 30/50; H04N 21/6118; H04B 1/40; H04B 17/318
See application file for complete search history.

(56) References Cited

U.S. PATENT DOCUMENTS

| | | | |
|---|---|---|---|
| 6,915,530 B1* | 7/2005 | Kauffman | H04N 7/102 348/E7.052 |
| 6,939,429 B2* | 9/2005 | Takemura | H01L 21/67132 156/302 |
| 2016/0112734 A1* | 4/2016 | Williams | H04H 20/78 725/118 |
| 2018/0234275 A1 | 8/2018 | Miller et al. | |
| 2019/0174162 A1 | 6/2019 | Soltanpur et al. | |

FOREIGN PATENT DOCUMENTS

EP 3579490 A1 12/2019

* cited by examiner

*Primary Examiner* — Sung S Ahn
(74) *Attorney, Agent, or Firm* — 2SPL Patent Attorneys PartG mbB; Kieran O'Leary (57) ABSTRACT

Examples relate to a cable modem, to an apparatus, device and method for a cable modem, and to an apparatus, device and method for a cable communication system. The apparatus or device for the cable modem comprises interface circuitry/communication means for communicating with transceiver circuitry/transceiving means of the cable modem, and processing circuitry/processing means. The processing circuitry/means is configured to determine information on a power level of received transmissions at a plurality of points in time in a plurality of frequency bands of an upstream spectrum via the transceiver circuitry, to determine, for each of the plurality of frequency bands, numeric information on an occurrence of one or more power levels of the received transmissions in the respective frequency band, and aggregate the numeric information on the occurrence of the one or more power levels of the received transmissions by frequency band.

23 Claims, 5 Drawing Sheets

CABLE MODEM, APPARATUS, DEVICE AND METHOD FOR A CABLE MODEM, APPARATUS, DEVICE AND METHOD FOR A CABLE COMMUNICATION SYSTEM

CROSS-REFERENCE TO RELATED APPLICATION

This application claims priority to European Application 20166217.8, filed on Mar. 27, 2020. The contents of this earlier filed application is incorporated by reference herein in its entirety.

FIELD

Examples relate to a cable modem, to an apparatus, device and method for a cable modem, and to an apparatus, device and method for a cable communication system.

BACKGROUND

Some communication systems are based on shared spectrum, i.e., a spectrum that is used by multiple transmitters and receivers. In such communication systems, time slots for making transmission in the shared spectrum are typically allocated by a central entity, to avoid collisions between transmissions of different devices. In addition to the scheduled transmissions, however, noise may occur in the shared spectrum, which may be generated by defective devices, or by noise sources that are located in proximity of a transmission resource (e.g., cable) being used for the transmissions.

One type of noise is called intermittent burst noise (i.e., ingress), which may be present in the upstream spectrum and may be difficult to detect using available methods, e.g., due to its intermittent properties. In some approaches, such sources of noise may be searched by a field technician, following a detection of degradation in service or a service call. The technician may find the source of the noise eventually, but such an approach may be costly and slow, and the ingress may not be seen while the technician is in the area. Also, this approach may require a disconnection of users. Alternatively, upstream spectrum analysis may be performed by the central entity (e.g., a Cable Modem Termination System, if the communication system is a cable communication system). This approach may be able to confirm the presence of ingress because the CMTS is capable of measuring in a period with no scheduled transmissions but might not be able to point at where the ingress is introduced in the network. Alternatively, or additionally, upstream spectrum analysis may be performed in the CM (Cable Modem). If the interference is constantly present (or almost constantly) and other modems are sufficiently isolated, the upstream spectrum analysis may help detect and locate the fault. If interference is intermittent (especially if ingress bursts are not lengthy) or if other CM transmissions are seen with power comparable to the interference, the upstream spectrum analysis may either fail detecting at all or provide some erroneous results. In another approach, pre-equalizer-based proactive plant fault detection may be used, which, under some conditions, might be able to detect the plant fault before it becomes a problem and introduces ingress. If a plant fault was not detected, however, this approach might not help with detecting or locating the source of ingress.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
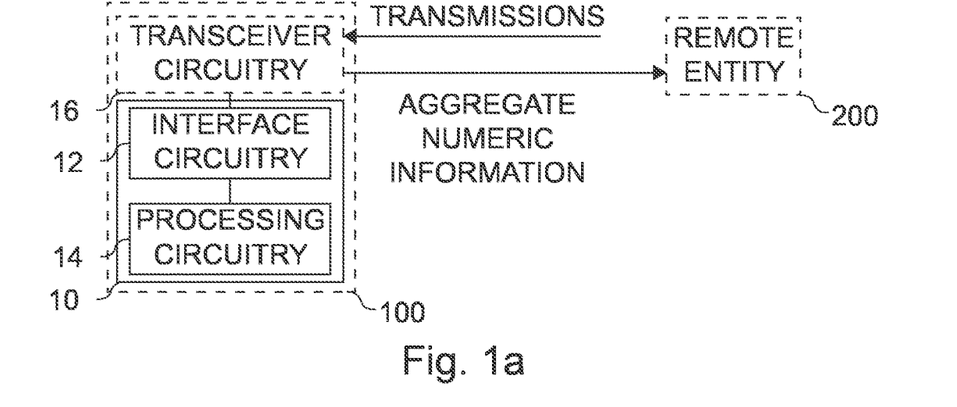
FIG. 1a shows a block diagram of an example of an apparatus or device for a cable modem and of a cable modem.

FIG. 1a shows a block diagram of an example of an apparatus 10 or device 10 for a cable modem 100 of a cable communication system 200. The components of the device 10 are defined as component means, which correspond to the respective structural components of the apparatus 10. The apparatus 10/device 10 comprises interface circuitry 12/communication means 12 for communicating with transceiver circuitry 16/transceiving means 16 of the cable modem. The apparatus 10/device 10 further comprises processing circuitry 14/processing means 14, which is coupled to the interface circuitry 12/communication means 12. In the following, where the functionality of the apparatus 10, and of the corresponding processing circuitry 14 and interface circuitry 12 is introduced, the same functionality also applies to the corresponding device, processing means, and communication means. The processing circuitry is configured to determine information on a power level of received transmissions at a plurality of points in time in a plurality of frequency bands of an upstream spectrum via the transceiver circuitry. The processing circuitry is configured to determine, for each of the plurality of frequency bands, numeric information on an occurrence of one or more power levels of the received transmissions in the respective frequency band. The processing circuitry is configured to aggregate the numeric information on the occurrence of the one or more power levels of the received transmissions by frequency band.

FIG. 1a further shows the cable modem 100 comprising the apparatus/device 10, and the transceiver circuitry/transceiving means 16. For example, the cable modem may be a cable modem for communicating based on the Data Over Cable Service Interface Specification, DOCSIS. Accordingly, the cable communication system may be based on DOCSIS.

Figure 1B:
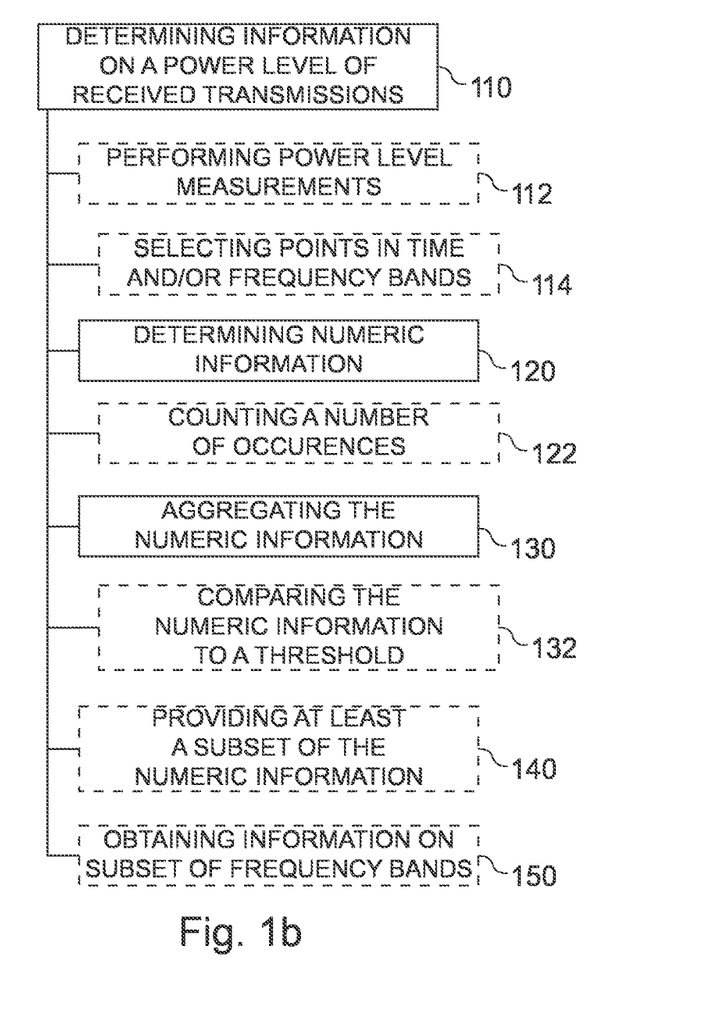
FIG. 1b shows a flow chart of an example of a method for a cable modem.

FIG. 1b shows a flow chart of an example of a corresponding method for a cable modem. The method comprises determining 110 information on a power level of received transmissions at a plurality of points in time in a plurality of frequency bands of an upstream spectrum via transceiving means of the cable modem. The method comprises determining 120, for each of the plurality of frequency bands, numeric information on an occurrence of one or more power levels of the received transmissions in the respective frequency band. The method comprises aggregating 130 the numeric information on the occurrence of the one or more power levels of the received transmissions by frequency band. For example, the cable modem 100 may be configured to perform the method.

The following description relates both to the apparatus/device of FIG. 1a and to the method of FIG. 1b. Features described in connection with the apparatus/device of FIG. 1a may likewise be applied to the method of FIG. 1b.

Examples of the present disclosure relate to a cable modem and to a corresponding apparatus, device, method and/or computer program for a cable modem. In general, a cable modem is a modulator/demodulator (or, in short, "modem") for accessing a cable communication network. In this context, the term "cable" may refer to coaxial cable, and the cable communication network may correspondingly be a communication network wherein the modems are connected to a central instance (e.g., a cable modem termination system) via coaxial cable, at least at the last mile. For example, the cable modem may be a cable modem for communicating based on the Data Over Cable Service Interface Specification, DOCSIS. Accordingly, the cable communication network may be a DOCSIS-based cable communication network. In the context of the present disclosure, the cable modem is also denoted a gateway, e.g., a DOCSIS gateway, as it may provide a gateway to a DOCSIS-based cable communication network. There are various versions and implementations of the DOCSIS, examples, however, may be applicable to any current, past or future version of the DOCSIS.

In general, cable communication networks use a shared spectrum, i.e., both the uplink spectrum and the downlink spectrum are shared among a plurality of cable modems. While transmission in the downlink spectrum is transmitted by a single entity, e.g., the DOCSIS Cable Modem Termination System, CMTS (and thus require no additional scheduling), transmissions of the cable modems within the uplink spectrum are scheduled by the scheduler of the cable communication network. The cable modems are assigned so-called slots or mini-slots (i.e., time slots) in the upstream channels of the upstream spectrum, and the cable modems use these slots to transmit their upstream packets on the shared medium.

Each cable modem, however, might only track the slots that are assigned to upstream transmissions provided by themselves, but not the slots that are assigned to other modems. Additionally, some slots might not be assigned or used by any of the cable modems, or slots ins some frequency ranges may be used for either downstream or upstream communication (in so-called "full duplex" mode). In short—apart from their own slots, cable modems might not be aware of that transmissions occur or should occur in the upstream spectrum. Nor does it matter for their communication, as the upstream transmission are usually received and processed (only) by the CMTS. In examples, however, the cable modems are configured to determine information on the transmissions that occur in the plurality of frequency bands of the upstream spectrum, e.g., to enable a determination of ingress within the upstream spectrum. For example, the frequency bands may be aligned with the upstream channels of the cable communication system. For example, in DOCSIS, upstream channels may have a channel width between 160 kHz and 96 MHz (in DOCSIS 3.1), so the frequency bands may be 0.16 MHz wide (or a multiple of 0.16 MHz). In general, the width of the frequency bands, and the corresponding frequencies, may be based on the width of frequency bands as defined in DOCSIS.

The processing circuitry is configured to determine the information on the power level of received transmissions, at a plurality of points in time in a plurality of frequency bands of the upstream spectrum (i.e., the upstream spectrum of the cable communication system). In other words, the processing circuitry is configured to collect information that represents the power level of transmissions that are received in a plurality of frequency bands of the upstream spectrum, over, or more precisely, at, a plurality of points in time. Thus, the information on the power level may be determined over two dimensions/axes, one axes defining the plurality of frequency bands, and the other axis defining the plurality of points in time. The plurality of points in time may stretch over some time, e.g., at least 10 minutes, or at least 30 minutes, at least 60 minutes, at least 120 minutes, as least 6 hours etc. In other words, the information on the power level of received transmissions may be collected over a time period, e.g., over a time period of at least 10 minutes, or at least 30 minutes, at least 60 minutes, at least 120 minutes, or at least 6 hours etc. The power level of the received transmissions may represent the amplitude of the received transmissions, i.e., their received power. The term "power level" was chosen in line with the usage of the term in the DOCSIS specification.

In general, the information on the power level of received transmissions may be determined by measuring the power levels of the received transmissions. In examples, the measurements may be conducted by the transceiver circuitry, and the information on the power level of received transmission may be obtained with the help the transceiver circuitry. The processing circuitry may thus use the transceiver circuitry to measure the power levels of the received transmissions. In other words, the processing circuitry may be configured to perform power level measurements 112 in one or more frequency bands of the plurality of frequency bands at the plurality of points in time via the transceiver circuitry. In other words, the processing circuitry may be configured to measure the power level of received transmissions in one or more frequency bands of the plurality of frequency bands at the plurality of points in time.

As is evident from the wording, during one measurement, the processing circuitry may measure in all of the frequency bands of the plurality of frequency bands, or only in a (proper) subset of the frequency bands. For example, at different points in time, the measurement may be performed in different frequency bands. For example, at some points in time, the cable modem may transmit in one of the frequency bands, and the processing circuitry may perform measurements in another frequency band. In more general terms, the processing circuitry may select the frequency bands, and the points in time, based on the current usage of the cable modem, e.g., based on the current load (i.e., utilization) of the cable modem. In other words. the processing circuitry may be configured to select 114 the plurality of points in time and/or the one or more frequency bands to be measured at the plurality of points in time based on a load of the cable modem.

The processing circuitry may be configured to determine the information on the power level of received transmissions at the plurality of points in time in the plurality of frequency bands based on the power level measurements. In other words, the power level measurements may be processed (e.g., quantized), and the information on the power level may be determined over the plurality of points in time, and the plurality of frequency bands. For example, the power level measurements may be stored within a database or within files, the information in the database representing the information on the power level.

In some examples, the measurements being performed may be power spectral density (PSD) measurements, which may be implemented similar to the Spectrum Analysis Proactive Network Management defined for the Downstream frequency band in the DOCSIS standard. Cable modems may comprise such a feature for performing PSD measurements in the upstream spectrum, e.g., due to requirements from operators. In other words, the processing circuitry may be configured to perform the power level measurements to determine a power spectral density of the received transmissions in the plurality of frequency bands (e.g., in the one or more frequency bands of the plurality of frequency bands). Alternatively, the power levels may be measured independently using narrow-band power level measurements in the individual frequency bands. In other words, the processing circuitry may be configured to perform a series of narrow-band power measurements in the plurality of frequency band (e.g., in the one or more frequency bands of the plurality of frequency bands).

In various examples, the goal is to use measurements that represent a single moment in time, e.g., to gain a snapshot of the power levels at this specific point in time. Therefore, the individual measurements may be taken as-is, e.g., without averaging over multiple measurements. In other words, the processing circuitry may be configured to determine the information on the power level of received transmissions without averaging the individual power level measurements of the respective frequency band. In some cable modems, however, this functionality may not be available. In this case, some averaging may be used. Additionally, or alternatively, a "max hold" or a "min hold" operation may be applied (where the maximal or minimal power level is output). Averaging and "max hold" or "min hold" may be applied together or separately, for example. For example, the processing circuitry may be configured to determine the information on the power level of received transmissions by averaging over multiple power level measurements of the respective frequency band. For example, the processing circuitry may be configured to apply a "max hold" operation on the averaged power levels of the received transmissions. The "max hold" operation may increase probability of detection in case the measurement is long or averaged.

In addition to the gathering of the raw measurements/power levels, numeric information is determined on the power levels of the received transmissions. In general, the numeric information one the occurrence of the one or more power levels on the occurrence of the received transmissions is a numeric representation of the occurrence of different power levels among the received transmissions. In more simple terms, the numeric information on the occurrence of the received transmissions may contain or represent a count of the occurrence of the different power levels. In other words, the processing circuitry may be configured to count 122 a number of occurrences of the one or more power levels to determine the numeric information. In examples, however, similar power levels may be grouped. For example, if a newly measured power level is within a range around a previously measured power level, the two power levels may be allocated to the same group of power levels and counted together. For example, if a newly measured power levels is within ±3 dB (or within ±1.5 dB, within ±4.5 dB, within ±6 dB etc.) of a previously measured power level, the count of the previously measured power level may be increased (instead of creating a new power level). In other words, two power levels (as measured by the processing circuitry) may be allocated to the same power level of the one or more power levels (i.e., the one or more power levels that are separately counted), if a difference between the two power levels is at most a threshold value (e.g., ±3 dB).

The processing circuitry is further configured to aggregate the numeric information on the occurrence of the one or more power levels of the received transmissions by frequency band. In other words, the processing circuitry may be configured to condense the information conveyed by the counted occurrences of the power levels into an aggregate information, which comprises information on the occurrences of the power levels in the individual frequency bands. For example, the aggregate may comprise information on the power levels that have occurred in each of the frequency bands (or at least a subset of the frequency bands). For example, the aggregate numeric information may comprise a histogram (i.e., an approximate distribution of the power levels that is based on the numerical information (count) on the occurrence of the one or more power levels) on the one or more power levels by frequency band for the plurality of frequency bands.

In various example, not all of the measured power levels may be relevant. For example, some power levels may be due to signal transitions (e.g., measured while a signal is ramping up or ramping down). Such power levels may be eliminated by measuring the power levels a large number of times (i.e., at the plurality of points in time, the plurality of points in time comprising a high number of times, such as at least 50 times, at least 100 times, at least 200 times, at least 1000 times etc.), such that power levels that are only once or rarely measured can be sorted out due to the sheer number of occurrences of other power levels that occur repeatedly. For example, the processing circuitry may be configured to compare 132 the numeric information one the occurrence of the one or more power levels to a numeric threshold, and to omit the numeric information on a power level from the aggregate (i.e., not include the respective power level in the aggregate) based on a comparison with the numeric threshold. For example, the numeric threshold may be a fixed threshold (e.g., three times, five times etc.), or a relative threshold (e.g., at least 10% or 20% of all measured power levels in the frequency band).

The aggregate may then be provided to a remote entity of the cable communication network for further processing, e.g., to identify power levels that are indicative of intermittent noise (e.g., over multiple cable modems). For example, some power levels may be readily identifiable as either representing the noise floor or transmissions of another cable modem (e.g., due to their high number or occurrence and low/high power levels. Some power levels might even be identifiable as being caused by intermittent bursts of noise. For example, the one or more power levels of the received transmissions in a frequency band may comprise one or more of a power level at a noise floor of the frequency band, a power level indicative of a transmission by another cable modem, and a power level indicative of intermittent noise. Other power levels, however, might be less obviously interpretable, and might only enable a clear distinction when the aggregate information of multiple cable modems is analyzed together. Accordingly, the processing circuitry may be configured to provide 140 (e.g., transmit) at least a subset of the aggregate numeric information to a remote entity 20 of the cable communication system. For example, the remote entity may be the CMTS of the cable communication system, or a (proactive) network management entity of the cable communication system. For example, the aggregate may be provided via the SNMP (Simple Network Management Protocol) to the remote entity.

In general, each cable modem may conduct the measurements, the determination of the numeric information on the occurrence of the power levels, and the aggregation of the numeric information in the background, e.g., as a long-time analysis of the upstream spectrum. Accordingly, at least the aggregation of the numeric information may be triggered by the cable modem. For example, the cable modem may periodically perform the measurements, the determination of the numeric information on the occurrence of the power levels, and the aggregation of the numeric information in the background, and periodically (or upon request) provide the aggregate to the remote entity. In some examples, however, the above measures may be triggered by the remote entity of the cable communication system. In other words, at least the aggregation of the numeric information may be triggered by the remote entity of the cable communication system. For example, the remote entity may trigger the aggregation of the numeric information (and potentially also the measurement and the determination of the numeric information on the occurrence of the power levels, if they are not conducted periodically) to investigate noise in the upstream spectrum that is measured by the CMTS of the cable communication system. Accordingly, the remote entity may limit the aggregation to the frequency band or frequency bands of interest. In other words, the processing circuitry may be configured to obtain 150 information on a subset of the plurality of frequency bands from the remote entity. For example, the subset of the plurality of frequency bands may be the frequency band or frequency bands of interest. The processing circuitry may be configured to aggregate the numeric information on the occurrence of the one or more power levels of the received transmissions by frequency band (only) for the subset of the plurality of frequency bands, e.g., the aggregate may be limited to the subset of the plurality of frequency bands.

The interface circuitry 12/communication means 12 may correspond to one or more inputs and/or outputs for receiving and/or transmitting information, which may be in digital (bit) values according to a specified code, within a module, between modules or between modules of different entities. For example, the interface circuitry 12/communication means 12 may comprise interface circuitry configured to receive and/or transmit information.

In embodiments the processing circuitry 14/processing means 14 may be implemented using one or more processing units, one or more processing devices, any means for processing, such as a processor, a computer or a programmable hardware component being operable with accordingly adapted software. In other words, the described function of the processing circuitry 14/processing means 14, may as well be implemented in software, which is then executed on one or more programmable hardware components. Such hardware components may comprise a general-purpose processor, a Digital Signal Processor (DSP), a micro-controller, etc.

The transceiver circuitry/transceiving means 16 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, etc.

More details and aspects of the apparatus, device and method for the cable modem and of the cable modem are mentioned in connection with the proposed concept or one or more examples described above or below (e.g., FIGS. 2a to 5). The apparatus, device and method for the cable modem and of the cable modem may comprise one or more additional optional features corresponding to one or more aspects of the proposed concept or one or more examples described above or below.

Figure 2A:
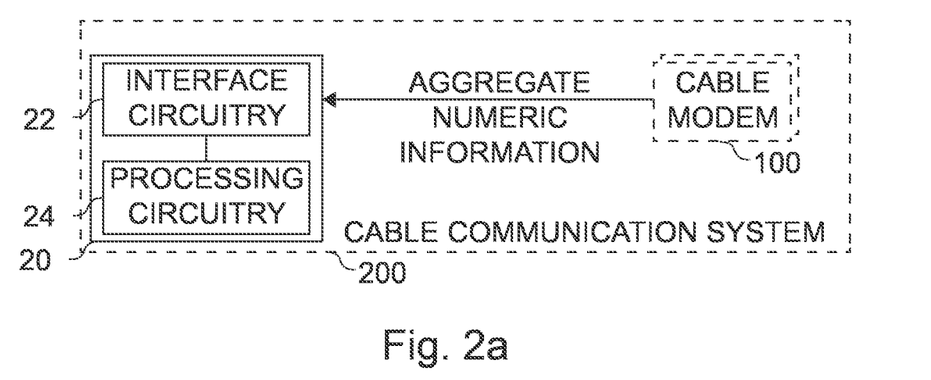
FIG. 2a shows a block diagram of an example of an apparatus or device for a cable communication system.

FIG. 2a shows a block diagram of an example of an apparatus 20 or device 20 for a cable communication system. For example, the apparatus 20 or device 20 may be the remote device introduced in connection with FIGS. 1a and/or 1b, or implement the functionality of the remote device. For example, the apparatus or device 20 may be suitable for a CMTS or for a PNM entity. The components of the device 20 are defined as component means, which correspond to the respective structural components of the apparatus 20. The apparatus 20/device 20 comprises interface circuitry 22/communication means 22 for communicating with one or more cable modems 100 of the cable communication system. The apparatus 20/device 20 further comprises processing circuitry 24/processing means 24, which is coupled to the interface circuitry 22/communication means. In the following, where the functionality of the apparatus 20, and of the corresponding processing circuitry 24 and interface circuitry 22 is introduced, the same functionality also applies to the corresponding device, processing means, and communication means. The processing circuitry is configured to obtain, from a cable modem 100, for a plurality of frequency bands of an upstream spectrum, aggregate numeric information on the occurrence of one or more power levels of transmissions received by frequency band.

FIG. 2a further shows the cable communication system comprising the apparatus/device 20 and the cable modem 100 (e.g., the cable modem 100 of FIGS. 1a to 1b).

Figure 2B:
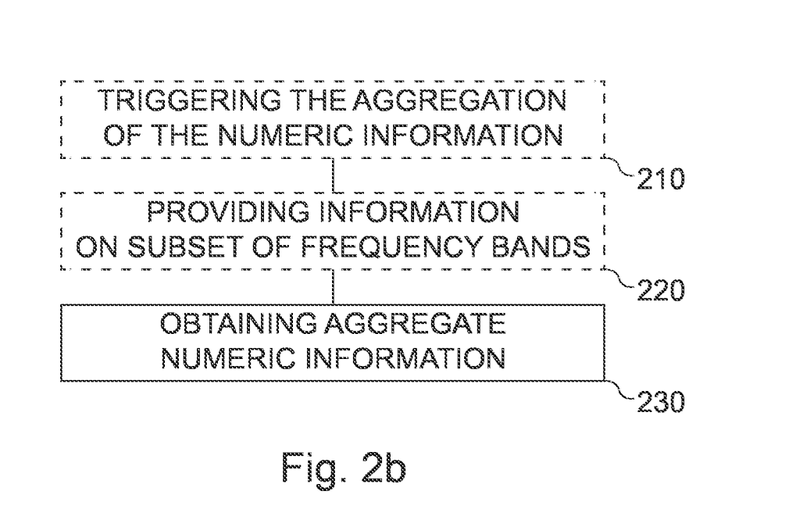
FIG. 2b shows a flow chart of an example of a method for a cable communication system.

FIG. 2b shows a flow chart of an example of a corresponding method for a cable communication system. The method comprises obtaining 230, from a cable modem 100 of the cable communication system, for a plurality of frequency bands of an upstream spectrum, aggregate numeric information on the occurrence of one or more power levels of transmissions received by frequency band.

The following description relates both to the apparatus/device of FIG. 2a and to the method of FIG. 2b. Features described in connection with the apparatus/device of FIG. 2a may likewise be applied to the method of FIG. 2b.

The processing circuitry is configured to obtain (i.e., receive, e.g., via SNMP), from a cable modem 100, for a plurality of frequency bands of an upstream spectrum, aggregate numeric information on the occurrence of one or more power levels of transmissions received by frequency band. For example, the processing circuitry may be configured to obtain the aggregated numeric information on the occurrence of the power levels that is provided by the apparatus 10/device 10 introduced in connection with FIGS. 1a and/or 1b.

As has been described in connection with FIGS. 1a and/or 1b, the aggregation of the numeric information may be triggered by the remote entity, i.e., the apparatus 20 or device 20. In other words, the processing circuitry may be configured to trigger 210 the aggregation of the numeric information on the occurrence of one or more power levels of transmissions received by frequency band at the cable modem, e.g., by providing suitable instructions to the cable modem (via the cable communication system). Accordingly, the apparatus 20/device 20 may also prescribe the subset of the plurality of frequency bands, for which the aggregation is to be performed. In other words, the processing circuitry may be configured to provide 220 information on a subset of the plurality of frequency bands to the cable modem. As has been described above, the subset of the plurality of frequency band are the frequency bands, in which noise has been detected by the CMTS. For example, if the apparatus/device 20 is implemented by, or part of, the CMTS, the apparatus may be configured to detect intermittent burst noise within the upstream spectrum of the cable communication system (e.g., via transceiver circuitry of the CMTS), and select the subset of frequency bands based on the detected intermittent burst noise. Accordingly, the aggregate numeric information on the occurrence of the one or more power levels of the received transmissions by frequency band may be based on the subset of the plurality of frequency bands.

The interface circuitry 22/communication means 22 may correspond to one or more inputs and/or outputs for receiving and/or transmitting information, which may be in digital (bit) values according to a specified code, within a module, between modules or between modules of different entities. For example, the interface circuitry 22/communication means 22 may comprise interface circuitry configured to receive and/or transmit information.

In embodiments the processing circuitry 24/processing means 24 may be implemented using one or more processing units, one or more processing devices, any means for processing, such as a processor, a computer or a programmable hardware component being operable with accordingly adapted software. In other words, the described function of the processing circuitry 24/processing means 24, may as well be implemented in software, which is then executed on one or more programmable hardware components. Such hardware components may comprise a general-purpose processor, a Digital Signal Processor (DSP), a micro-controller, etc.

More details and aspects of the apparatus, device and method for the cable communication system and of the cable communication system are mentioned in connection with the proposed concept or one or more examples described above or below (e.g., FIG. 1a to 1b, 3 to 5). The apparatus, device and method for the cable communication system and of the cable communication system may comprise one or more additional optional features corresponding to one or more aspects of the proposed concept or one or more examples described above or below.

Various examples of the present disclosure relate to a concept/method for ingress detection in the DOCSIS return path using background spectrum analysis in the cable modem.

Example of the present disclosure may use a basic capability of the CM (Cable Modem) to perform a fast non-averaged spectrum analysis operation to gather statistical spectrum data over time. It may then build a PSD histogram per frequency and points out the consistent levels for that frequency. This may result in lower ingress PSD being seen, despite signals with higher PSD being present at that frequency, making it possible to determine the presence of the ingress and narrow the search to a very small area. The detection may occur prior to any impact on service or during a targeted analysis triggered by a service degradation.

Such an ingress detection method may provide a high value to the network operators, it may make the CM an efficient ingress detection tool, and it may greatly reduce operation expenditures by reducing or avoiding truck rolls. Examples of the present disclosure may provide cost savings, and/or a faster response/resolution time to detected problems or service calls.

Ingress in the upstream may be considered a complicated problem to deal with, due to the "multiple transmitters to single receiver" nature of the return path, which may make the source of the ingress harder to locate and which may make a problem with one subscriber affect other subscribers as well.

Traditionally, when ingress was seen in the return path, a field technician was dispatched to locate the source of the problem. This may be costly and time consuming. Proactive detection of the faults in the plant, when applicable and successful, may help in preventing some of the ingress issues. Upstream spectrum analysis in the CM is often seen as a tool that may help narrowing down the search to a small group of modems instead of "dividing and conquering" between all the CMs on the node. But upstream spectrum analysis in the CM is usually limited and, in some cases, a simple spectrum analysis will not show the ingress because the ingress is likely to be intermittent and its power levels lower than legitimate transmissions from other CM on the same tap.

Examples of the present disclosure may thus provide a background measurement concept. The proposed mechanism to detect ingress at the CM may be based on the CM's spectrum analysis measurements in the background, which may be conducted over a long period of time, as opposed to performing a single measurement as instructed from an external PNM (Proactive Network Management) request. This may allow the CM (and the supporting PNM tools) to be more proactive rather than being reactive to already known issues.

The measurements may be performed by the CM without the PNM server initiating it and may potentially generate an indication of the detected problem. This may allow the operator to locate and resolve the fault, potentially before the problem starts affecting service or the impact on the service is increased.

The analysis (e.g., the power level measurements, determining of the numeric information and/or the aggregation of the numeric information) may be initiated by the CM itself instead of PNM server, and may be performed repeatedly over a long period of time (e.g., hours, days . . . ). The analysis may be done in small or large segments and resolution, depending on the limitations of the spectrum analysis implementation, e.g., with the guiding principle of achieving the shortest duration of the raw non-averaged data collection operation (the duration of the consequent data analysis is not as critical). The CM may decide when to perform the periodic analysis, considering the current load and resources and deciding on the most "convenient" timing. The spectrum analysis (e.g., the power level measurements) may be done in non-averaging mode, although some averaging or "max hold"-type mode or a mix of both could be used (e.g., one run of averaged background analysis, next run of "max hold" analysis and so on). No averaging may be best for finding intermittent interference, averaging may be used to detect constant ingress more reliably, and/or max hold could be used to increase burst ingress detection probability if no-averaging is not an option. Use of this method in the field may show some advantages to averaging or maxing in some sceneries, but the assumption is that fast no-averaging measurements will provide better raw data for subsequent analyses.

Alternatively, a series of narrow-band power measurements by the CM may be used instead of spectrum analyses. The same principles apply—the raw data gathering duration may be as short as possible. The spectrum analysis picture may be assembled from the single point power measurements. Resolution of the PSD levels "slicing" may be set depending on the targeted accuracy.

Examples may comprise data collection and analysis. The proposed statistics-based detection scheme may rely on spectrum analyses (or as mentioned above—narrow band power measurements, with both may fall under the term "power level measurements") gathered over time to detect the presence of ingress. It targets to be effective for both static and burst types of ingress.

It may be assumed that each time the "basic" spectrum analysis measurement is done it will show one of the following in each frequency bin:

Measurement noise floor (e.g., monitoring CM's own receiver noise floor or external noise floor);

PSD of the strongest signal seen at the bin;

Interferences with PSD levels below the maximal PSD of the bin in case such interferences exist, assuming that it is a signal that may be bursty but has a constant PSD when transmitting; and Various levels resulting from measurements while PSD was changing, or averaged measurements that saw several PSD levels in the duration of the measurements etc. Those are measurements that might not be informative and may be discarded during analysis.

In the data collection stage, the, the CM may perform upstream spectrum analysis periodically.

Figure 3:
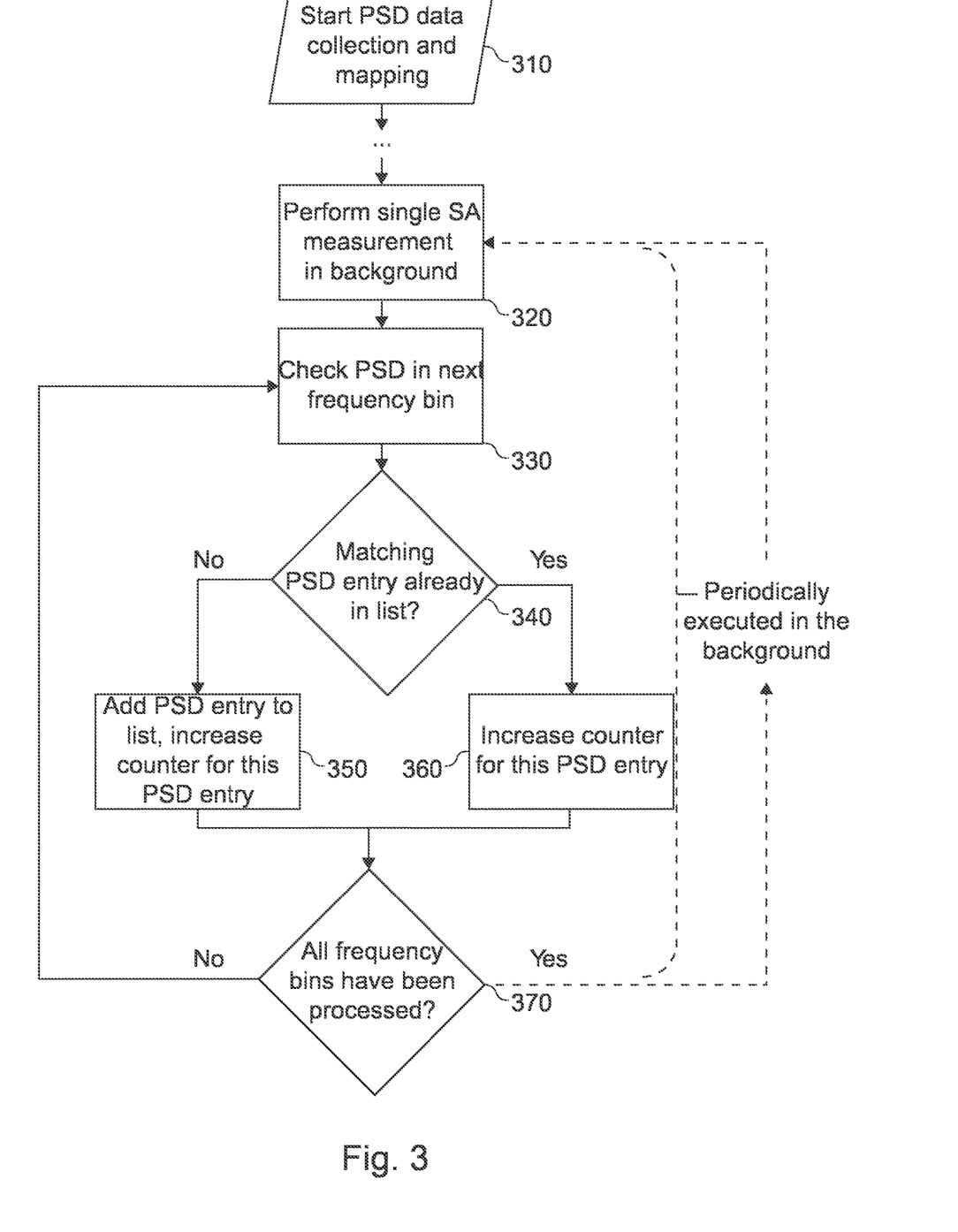
FIG. 3 shows a schematic diagram of an example of a data collection stage.

FIG. 3 shows a schematic diagram of an example of a (PSD) data collection stage. The data collection stage may start with the PSD data collection and mapping 310, which may comprise other features that are performed during or after the start of the data collection (as indicated by " . . . " in FIG. 3). Single spectrum analysis (SA) measurements (i.e., the measurements of the power levels of the received transmissions) may be performed 320 in the background. For each spectrum analysis measurement (short, without averaging), in each frequency bin (i.e., frequency range of the plurality of frequency ranges), the CM may check 330 and compare the existing PSD level list (i.e., the one or more power levels) for that bin with the measured PSD. It may be determined 340 whether a matching PSD entry is already in the list. If the measured PSD is in the range of ±3 dB (as an example, other values may be used based on experience of using the approach in the field) from one of the existing values in the list—no action is taken (values of ±6 dB or even higher can be considered equal due to the accuracy of the spectrum analysis, with the accuracy requirement being ±6 dB), and the counter for this PSD entry may be increased 360. For example, the chosen threshold may be programmed/adjusted for best results based on experience of using this method in the field. If the measured PSD is more than 6 dB different from existing PSD levels, it may be added 350 to the list of PSD levels, and its counter may be increased. Then, the CM may determine whether all frequency bins have been processed 370, if yes, the next SA measurement 320 may be processed, if no, the next frequency bin may be processed 330.

After several runs (e.g., several iterations, such as 10, 20, 50, 60, 100, 120 etc.) the list for each bin may have the PSD values that were measured at that specific bin. In the end of the PSD mapping stage, the list may be sorted to be later used as the series axis of the histogram.

For each spectrum analysis run (without averaging), in each frequency bin the CM may compare 340 the measured PSD (with ±3 dB margins) to the logged PSD values in the list. Each entry in the PSD list of the frequency bin may have a counter (i.e., numeric information). The counter of the PSD level that corresponds to the current measured PSD will be increased by 1 (e.g., if the PSD entry already exists 360, or when the PSD entry is created 350).

After completing a sufficient (e.g., 10, 20, 50, 60, 100, 120 etc.) number of iterations of spectrum analysis in the background or when instructed so by the network, the CM may process and analyze the PSD level histogram data of each frequency bin (e.g., to determine the aggregate numeric information).

Assuming near-constant PSD levels, it is likely that over long time (multiple background iterations of spectrum analysis) PSD level histogram of each frequency bin may show high counter values for some PSD levels and show low or zero counter values for the rest of the PSD levels. PSD levels that have a low number of hits may be discarded (i.e., omitted from the aggregate) and only the levels that have a significant number of hits (or pass a predefined threshold) may be left. Various methods of identifying the relevant and the "noise" counters or thresholds may be used.

Figure 4:
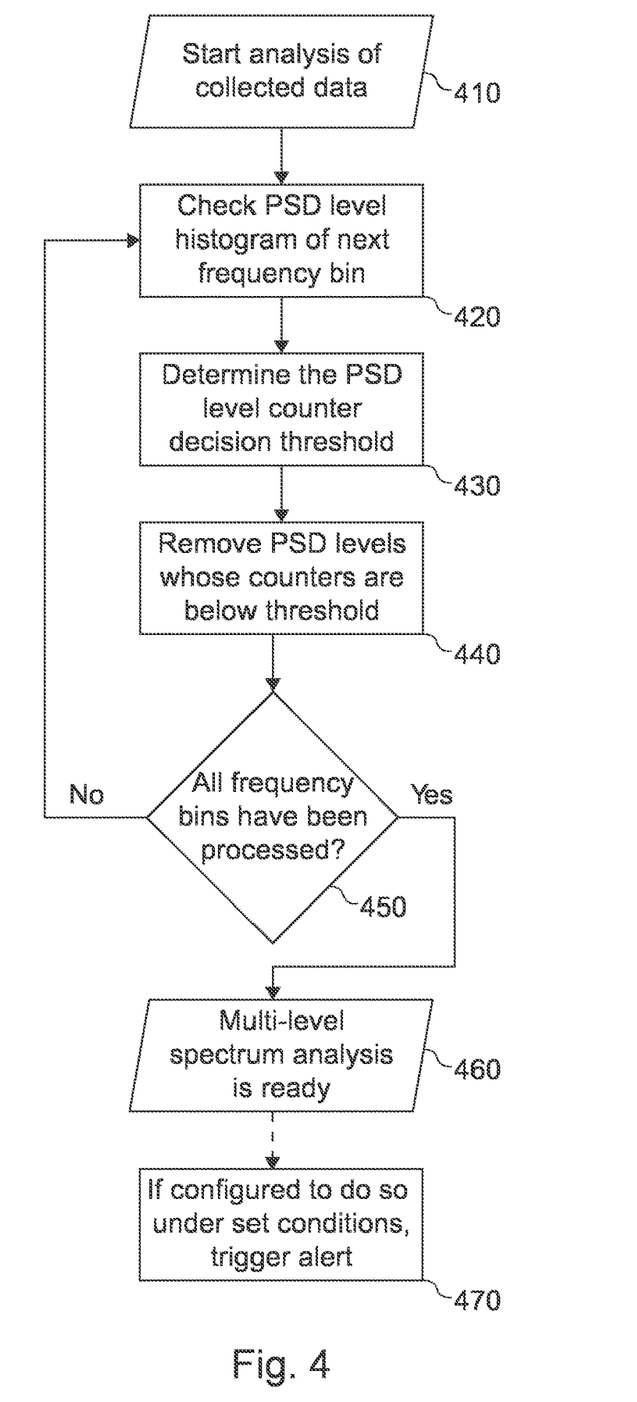
FIG. 4 shows a schematic diagram of an example of an analysis stage.

FIG. 4 shows a schematic diagram of an example of an (histogram) analysis stage. The CM may start 410 the analysis of the collected data, e.g., by checking 420 the PSD level histogram of the next frequency bin. For each frequency bin, a threshold may be used to filter the significant counters from errors and measurements done while PSD was changing. For example, the PSD level counter decision threshold may be determined 430, and the PSD levels may be removed 440 whose counters are below the threshold. Then, the next frequency bin may be processed 420, until all frequency bins have been processed 450 and the multi-spectrum analysis (i.e., the aggregate numeric information) is ready 460. If the CM is configured to do so under set conditions, an alert may be triggered 470.

If a constantly transmitted signal is seen in the frequency bin, the counter of the corresponding PSD level may get multiple hits. If no signal is seen in the bin, then the PSD corresponding to the measured (or measurement) noise level may get multiple hits. Other PSD levels may get some hits because sometimes the measurement of the specific bin may be done while the PSD is changing, or due to measurement errors.

In case when there are multiple levels seen in the same frequency bin at different times, all the present PSD level counters may get hits over time. For example, in one scenario, this may be due to an upstream channel from a CM in proximity of the measuring modem, transmitting bursts some of the time. This may get hits in the maximum PSD and in noise level PSD.

In another scenario, intermittent ingress may be seen by the CM. The PSD of the ingress as measured by the CM and the noise level PSD may get most hits.

In yet another scenario, an upstream channel transmitting some of the time with some in-band ingress (constant or bursty) may be seen. The upstream channel's PSD and ingress PSD counters may get most hits, with the noise floor PSD also getting hits in case the spectrum has silence at the frequency bin when neither the upstream nor the ingress are present.

The cable network operator may configure the frequency bins/ranges of interest. The bins of interest may include the upstream channels used by the CMTS or may include bins that are known to be susceptible to ingress.

If a bin corresponds to an upstream channel, presence of an additional significant (in terms of counter hits) PSD in the bin besides the noise PSD may represent ingress. If a bin does not correspond to an upstream channel—ingress can be detected in the bin if a PSD level aside from the noise is seen, and it is up to the operator to decide whether this is of any interest for network maintenance. Discarded counter values may provide an indication of the PSD histogram analysis reliability. High value of discarded levels may indicate a problem in PSD mapping and high variability in measurements. Nevertheless, it may also represent significant noise in the bin A rule of thumb for the scheme described above is that sample capture of a single measurement may take as short time as possible to avoid capture of multiple PSD levels in one measurement. Depending on the specific implementation, this may mean that instead of using spectrum analysis of a segment as a basic measurement function it could be better to use power measurement in each frequency "bin" because of the corresponding sample capture duration. The latency of a single measurement sample capture may, in this context, refer to the time during which the ADC samples for the measurement are captured, and NOT to the time that it takes to perform subsequent processing and analysis.

Figure 5:
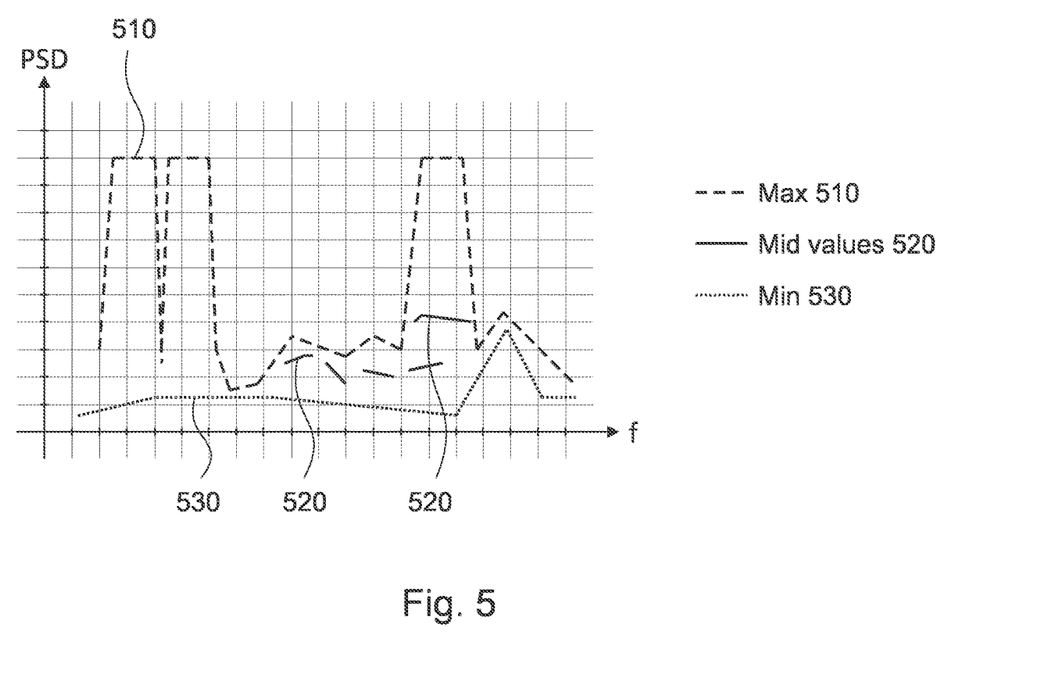
FIG. 5 shows an example of an output of a histogram-based spectrum analysis.

FIG. 5 shows an example of an (expected) output of a histogram-based spectrum analysis. Graph 510 shows the maximum PSD recorded for each bin, graph 530 shows the minimum PSD for each bin and the graph 520 shows mid-values whose histogram counters were above the set threshold. Mid-values that have high counters indicate a signal that was seen at the same PSD multiple times, suggesting that several signals may exist at the same frequency, with some potentially being unwanted. These are exactly the in-band under-lying intermittent interferences that this approach is targeting, and they are the interferences that are difficult to detect using other methods. The results can be displayed per request by the operator or by network monitoring tools and may also be used by the CM itself to detect ingress and trigger an alert if configured to do so by the network operator. Spectrum analysis plots of other approaches might not include several levels of detected PSD that become apparent over time. An SA plot generated according to the proposed concept may have indications of several PSD per frequency and may get updated over time based on data gathered in the background.

More details and aspects of the concept for ingress detection are mentioned in connection with the proposed concept or one or more examples described above or below (e.g., FIG. 1a to 2b). The concept for ingress detection may comprise one or more additional optional features corresponding to one or more aspects of the proposed concept or one or more examples described above or below.

The aspects and features mentioned and described together with one or more of the previously detailed examples and figures, may as well be combined with one or more of the other examples in order to replace a like feature of the other example or in order to additionally introduce the feature to the other example.

Example 1 relates to an apparatus (10) for a cable modem (100) of a cable communication system (200), the apparatus (10) comprising interface circuitry (12) for communicating with transceiver circuitry (16) of the cable modem. The apparatus (10) comprises processing circuitry (14) configured to determine information on a power level of received transmissions at a plurality of points in time in a plurality of frequency bands of an upstream spectrum via the transceiver circuitry, determine, for each of the plurality of frequency bands, numeric information on an occurrence of one or more power levels of the received transmissions in the respective frequency band, and aggregate the numeric information on the occurrence of the one or more power levels of the received transmissions by frequency band.

In Example 2, the subject matter of example 1 or any of the Examples described herein may further include, that the processing circuitry is configured to count a number of occurrences of the one or more power levels to determine the numeric information.

In Example 3, the subject matter of one of the examples 1 to 2 or any of the Examples described herein may further include, that the processing circuitry is configured to compare the numeric information one the occurrence of the one or more power levels to a numeric threshold, and to omit the numeric information on a power level from the aggregate based on a comparison with the numeric threshold.

In Example 4, the subject matter of one of the examples 1 to 3 or any of the Examples described herein may further include, that the processing circuitry is configured to provide at least a subset of the aggregate numeric information to a remote entity (20) of the cable communication system.

In Example 5, the subject matter of one of the examples 1 to 4 or any of the Examples described herein may further include, that the processing circuitry is configured to perform power level measurements in one or more frequency bands of the plurality of frequency bands at the plurality of points in time via the transceiver circuitry, and to determine the information on the power level of received transmissions at the plurality of points in time in the plurality of frequency bands based on the power level measurements.

In Example 6, the subject matter of example 5 or any of the Examples described herein may further include, that the processing circuitry is configured to select the plurality of points in time and/or the one or more frequency bands to be measured at the plurality of points in time based on a load of the cable modem.

In Example 7, the subject matter of one of the examples 5 to 6 or any of the Examples described herein may further include, that the processing circuitry is configured to determine the information on the power level of received transmissions without averaging the individual power level measurements of the respective frequency band.

In Example 8, the subject matter of one of the examples 5 to 6 or any of the Examples described herein may further include, that the processing circuitry is configured to determine the information on the power level of received transmissions by averaging over multiple power level measurements of the respective frequency band.

In Example 9, the subject matter of one of the examples 5 to 8 or any of the Examples described herein may further include, that the processing circuitry is configured to perform the power level measurements to determine a power spectral density of the received transmissions in the plurality of frequency bands.

In Example 10, the subject matter of one of the examples 1 to 9 or any of the Examples described herein may further include, that the one or more power levels of the received transmissions in a frequency band comprise one or more of a power level at a noise floor of the frequency band, a power level indicative of a transmission by another cable modem, and a power level indicative of intermittent noise.

In Example 11, the subject matter of one of the examples 1 to 10 or any of the Examples described herein may further include that at least the aggregation of the numeric information is triggered by the cable modem.

In Example 12, the subject matter of one of the examples 1 to 11 or any of the Examples described herein may further include that at least the aggregation of the numeric information is triggered by a remote entity of the cable communication system.

In Example 13, the subject matter of one of the examples 1 to 12 or any of the Examples described herein may further include, that the processing circuitry is configured to obtain information on a subset of the plurality of frequency bands from the remote entity, and to aggregate the numeric information on the occurrence of the one or more power levels of the received transmissions by frequency band for the subset of the plurality of frequency bands.

In Example 14, the subject matter of one of the examples 1 to 13 or any of the Examples described herein may further include, that the aggregate numeric information comprises a histogram on the one or more power levels by frequency band for the plurality of frequency bands.

In Example 15, the subject matter of one of the examples 1 to 14 or any of the Examples described herein may further include, that two power levels are allocated to the same power level of the one or more power levels if a difference between the two power levels is at most a threshold value.

Example 16 relates to a cable modem (100) for a cable communication system (200), the cable modem comprising the apparatus (10) according to one of the examples 1 to 15.

In Example 17, the subject matter of example 16 or any of the Examples described herein may further include, that the cable modem is a cable modem for communicating based on the Data Over Cable Service Interface Specification, DOCSIS, and/or wherein the cable communication system is based on DOCSIS.

Example 18 relates to an apparatus (20) for a cable communication system (200), the apparatus comprising interface circuitry (22) for communicating with one or more cable modems (100) of the cable communication system. The apparatus (20) comprises processing circuitry (24) configured to obtain, from a cable modem (100), for a plurality of frequency bands of an upstream spectrum, aggregate numeric information on the occurrence of one or more power levels of transmissions received by frequency band.

In Example 19, the subject matter of example 18 or any of the Examples described herein may further include, that the processing circuitry is configured to trigger the aggregation of the numeric information on the occurrence of one or more power levels of transmissions received by frequency band at the cable modem.

In Example 20, the subject matter of example 19 or any of the Examples described herein may further include, that the processing circuitry is configured to provide information on a subset of the plurality of frequency bands to the cable modem, wherein the aggregate numeric information on the occurrence of the one or more power levels of the received transmissions by frequency band is based on the subset of the plurality of frequency bands.

Example 21 relates to a device (10) for a cable modem (100) of a cable communication system (200), the device (10) comprising communication means (12) for communicating with transceiving means (16) of the cable modem. The device (10) comprises processing means (14) configured for determining information on a power level of received transmissions at a plurality of points in time in a plurality of frequency bands of an upstream spectrum via the transceiving means, determining, for each of the plurality of frequency bands, numeric information on an occurrence of one or more power levels of the received transmissions in the respective frequency band, and aggregating the numeric information on the occurrence of the one or more power levels of the received transmissions by frequency band.

In Example 22, the subject matter of example 21 or any of the Examples described herein may further include, that the processing means is configured for counting a number of occurrences of the one or more power levels to determining the numeric information.

In Example 23, the subject matter of one of the examples 21 to 22 or any of the Examples described herein may further include, that the processing means is configured for comparing the numeric information one the occurrence of the one or more power levels to a numeric threshold, and for omitting the numeric information on a power level from the aggregate based on a comparison with the numeric threshold.

In Example 24, the subject matter of one of the examples 21 to 23 or any of the Examples described herein may further include, that the processing means is configured for providing at least a subset of the aggregate numeric information to a remote entity (20) of the cable communication system.

In Example 25, the subject matter of one of the examples 21 to 24 or any of the Examples described herein may further include, that the processing means is configured for performing power level measurements in one or more frequency bands of the plurality of frequency bands at the plurality of points in time via the transceiving means, and for determining the information on the power level of received transmissions at the plurality of points in time in the plurality of frequency bands based on the power level measurements.

In Example 26, the subject matter of example 25 or any of the Examples described herein may further include, that the processing means is configured for selecting the plurality of points in time and/or the one or more frequency bands to be measured at the plurality of points in time based on a load of the cable modem.

In Example 27, the subject matter of one of the examples 25 to 26 or any of the Examples described herein may further include, that the processing means is configured for determining the information on the power level of received transmissions without averaging the individual power level measurements of the respective frequency band.

In Example 28, the subject matter of one of the examples 25 to 26 or any of the Examples described herein may further include, that the processing means is configured for determining the information on the power level of received transmissions by averaging over multiple power level measurements of the respective frequency band.

In Example 29, the subject matter of one of the examples 25 to 28 or any of the Examples described herein may further include, that the processing means is configured for performing the power level measurements to determine a power spectral density of the received transmissions in the plurality of frequency bands.

In Example 30, the subject matter of one of the examples 21 to 29 or any of the Examples described herein may further include, that the one or more power levels of the received transmissions in a frequency band comprise one or more of a power level at a noise floor of the frequency band, a power level indicative of a transmission by another cable modem, and a power level indicative of intermittent noise.

In Example 31, the subject matter of one of the examples 21 to 30 or any of the Examples described herein may further include that at least the aggregation of the numeric information is triggered by the cable modem.

In Example 32, the subject matter of one of the examples 21 to 31 or any of the Examples described herein may further include that at least the aggregation of the numeric information is triggered by a remote entity of the cable communication system.

In Example 33, the subject matter of one of the examples 21 to 32 or any of the Examples described herein may further include, that the processing means is configured for obtaining information on a subset of the plurality of frequency bands from the remote entity, and for aggregating the numeric information on the occurrence of the one or more power levels of the received transmissions by frequency band for the subset of the plurality of frequency bands.

In Example 34, the subject matter of one of the examples 21 to 33 or any of the Examples described herein may further include, that the aggregate numeric information comprises a histogram on the one or more power levels by frequency band for the plurality of frequency bands.

In Example 35, the subject matter of one of the examples 21 to 34 or any of the Examples described herein may further include, that two power levels are allocated to the same power level of the one or more power levels if a difference between the two power levels is at most a threshold value.

Example 36 relates to a cable modem (100) for a cable communication system (200), the cable modem comprising the device (10) according to one of the examples 21 to 35.

In Example 37, the subject matter of example 16 or any of the Examples described herein may further include, that the cable modem is a cable modem for communicating based on the Data Over Cable Service Interface Specification, DOCSIS, and/or wherein the cable communication system is based on DOCSIS.

Example 38 relates to a device (20) for a cable communication system (200), the device comprising communication means (22) for communicating with one or more cable modems (100) of the cable communication system. The device (20) comprises processing means (24) configured for obtaining, from a cable modem (100), for a plurality of frequency bands of an upstream spectrum, aggregate numeric information on the occurrence of one or more power levels of transmissions received by frequency band.

In Example 39, the subject matter of example 38 or any of the Examples described herein may further include, that the processing means is configured for triggering the aggregation of the numeric information on the occurrence of one or more power levels of transmissions received by frequency band at the cable modem.

In Example 40, the subject matter of example 39 or any of the Examples described herein may further include, that the processing means is configured for providing information on a subset of the plurality of frequency bands to the cable modem, wherein the aggregate numeric information on the occurrence of the one or more power levels of the received transmissions by frequency band is based on the subset of the plurality of frequency bands.

Example 41 relates to a method for a cable modem (100) of a cable communication system (200), the method comprising determining (110) information on a power level of received transmissions at a plurality of points in time in a plurality of frequency bands of an upstream spectrum via transceiving means of the cable modem. The method comprises determining (120), for each of the plurality of frequency bands, numeric information on an occurrence of one or more power levels of the received transmissions in the respective frequency band. The method comprises aggregating (130) the numeric information on the occurrence of the one or more power levels of the received transmissions by frequency band.

In Example 42, the subject matter of example 41 or any of the Examples described herein may further include, that the method comprises counting (122) a number of occurrences of the one or more power levels to determining the numeric information.

In Example 43, the subject matter of one of the examples 41 to 42 or any of the Examples described herein may further include, that the method comprises comparing (132) the numeric information one the occurrence of the one or more power levels to a numeric threshold and omitting the numeric information on a power level from the aggregate based on a comparison with the numeric threshold.

In Example 44, the subject matter of one of the examples 41 to 43 or any of the Examples described herein may further include, that the method comprises providing (140) at least a subset of the aggregate numeric information to a remote entity of the cable communication system.

In Example 45, the subject matter of one of the examples 41 to 44 or any of the Examples described herein may further include, that the method comprises performing (112) power level measurements in one or more frequency bands of the plurality of frequency bands at the plurality of points in time via the transceiving means, and determining (110) the information on the power level of received transmissions at the plurality of points in time in the plurality of frequency bands based on the power level measurements.

In Example 46, the subject matter of example 45 or any of the Examples described herein may further include, that the method comprises selecting (114) the plurality of points in time and/or the one or more frequency bands to be measured at the plurality of points in time based on a load of the cable modem.

In Example 47, the subject matter of one of the examples 45 to 46 or any of the Examples described herein may further include, that the information on the power level of received transmissions is determined without averaging the individual power level measurements of the respective frequency band.

In Example 48, the subject matter of one of the examples 45 to 46 or any of the Examples described herein may further include, that the information on the power level of received transmissions is determined by averaging over multiple power level measurements of the respective frequency band.

In Example 49, the subject matter of one of the examples 45 to 48 or any of the Examples described herein may further include, that the power level measurements are performed to determine a power spectral density of the received transmissions in the plurality of frequency bands.

In Example 50, the subject matter of one of the examples 41 to 49 or any of the Examples described herein may further include, that the one or more power levels of the received transmissions in a frequency band comprise one or more of a power level at a noise floor of the frequency band, a power level indicative of a transmission by another cable modem, and a power level indicative of intermittent noise.

In Example 51, the subject matter of one of the examples 41 to 50 or any of the Examples described herein may further include that at least the aggregation (130) of the numeric information is triggered by the cable modem.

In Example 52, the subject matter of one of the examples 41 to 51 or any of the Examples described herein may further include that at least the aggregation (130) of the numeric information is triggered by a remote entity of the cable communication system.

In Example 53, the subject matter of one of the examples 41 to 52 or any of the Examples described herein may further include that the method comprises obtaining (150) information on a subset of the plurality of frequency bands from the remote entity and aggregating (130) the numeric information on the occurrence of the one or more power levels of the received transmissions by frequency band for the subset of the plurality of frequency bands.

In Example 54, the subject matter of one of the examples 41 to 53 or any of the Examples described herein may further include, that the aggregate numeric information comprises a histogram on the one or more power levels by frequency band for the plurality of frequency bands.

In Example 55, the subject matter of one of the examples 41 to 54 or any of the Examples described herein may further include, that two power levels are allocated to the same power level of the one or more power levels if a difference between the two power levels is at most a threshold value.

Example 56 relates to a cable modem (100) for a cable communication system (200), the cable modem being configured to perform the method according to one of the examples 41 to 55.

In Example 57, the subject matter of example 56 or any of the Examples described herein may further include, that the cable modem is a cable modem for communicating based on the Data Over Cable Service Interface Specification, DOCSIS, and/or wherein the cable communication system is based on DOCSIS.

Example 58 relates to a method for a cable communication system (200), the method comprising obtaining (230), from a cable modem (100) of the cable communication system, for a plurality of frequency bands of an upstream spectrum, aggregate numeric information on the occurrence of one or more power levels of transmissions received by frequency band.

In Example 59, the subject matter of example 58 or any of the Examples described herein may further include, that the method comprises triggering (210) the aggregation of the numeric information on the occurrence of one or more power levels of transmissions received by frequency band at the cable modem.

In Example 60, the subject matter of example 59 or any of the Examples described herein may further include, that the method comprises providing (220) information on a subset of the plurality of frequency bands to the cable modem, wherein the aggregate numeric information on the occurrence of the one or more power levels of the received transmissions by frequency band is based on the subset of the plurality of frequency bands.

Example 61 relates to a system comprising the cable modem according to one of the Examples 16, 17, 36, 37, 56 or 57 or according to any other Example and an apparatus or device according to one of the Examples 18 to 20 or 38 to 40.

Example 62 relates to a machine-readable storage medium including program code, when executed, to cause a machine to perform the method of one of the Examples 41 to 55 or according to any other Example, or the method of one of the Examples 58 to 60 or according to any other Example.

Example 63 relates to a computer program having a program code for performing the method of one of the Examples 41 to 55 (or according to any other Example) or the method of one of the Examples 58 to 60 (or according to any other Example), when the computer program is executed on a computer, a processor, or a programmable hardware component.

Example 64 relates to a machine-readable storage including machine readable instructions, when executed, to implement a method or realize an apparatus as claimed in any pending claim or shown in any Example.

Examples may further be or relate to a computer program having a program code for performing one or more of the above methods, when the computer program is executed on a computer or processor. Examples provide a machine-readable storage medium including program code, when executed, to cause a machine to perform one of the methods shown in examples or claimed in the claims. Examples provide a computer program having a program code for performing one of the methods shown in examples or claimed in the claim, when the computer program is executed on a computer, a processor, or a programmable hardware component. Examples provide a machine-readable storage including machine readable instructions, when executed, to implement a method or realize an apparatus as claimed in any pending claim.

Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for a cable modem of a cable communication system, the apparatus comprising:
   interface circuitry for communicating with transceiver circuitry of the cable modem; and
   processing circuitry configured to:
   determine information on a power level of received transmissions at a plurality of points in time in a plurality of frequency bands of an upstream spectrum via the transceiver circuitry,
   determine, for each of the plurality of frequency bands, numeric information on an occurrence of one or more power levels of the received transmissions in the respective frequency band, and
   aggregate the numeric information on the occurrence of the one or more power levels of the received transmissions by frequency band.

2. The apparatus according to claim 1, wherein the processing circuitry is configured to count a number of occurrences of the one or more power levels to determine the numeric information.

3. The apparatus according to claim 1, wherein the processing circuitry is configured to compare the numeric information one the occurrence of the one or more power levels to a numeric threshold, and to omit the numeric information on a power level from the aggregate based on a comparison with the numeric threshold.

4. The apparatus according to claim 1, wherein the processing circuitry is configured to provide at least a subset of the aggregate numeric information to a remote entity of the cable communication system.

5. The apparatus according to claim 1, wherein the processing circuitry is configured to perform power level measurements in one or more frequency bands of the plurality of frequency bands at the plurality of points in time via the transceiver circuitry, and to determine the information on the power level of received transmissions at the plurality of points in time in the plurality of frequency bands based on the power level measurements.

6. The apparatus according to claim 5, wherein the processing circuitry is configured to select the plurality of points in time and/or the one or more frequency bands to be measured at the plurality of points in time based on a load of the cable modem.

7. The apparatus according to claim 5, wherein the processing circuitry is configured to determine the information on the power level of received transmissions without averaging the individual power level measurements of the respective frequency band.

8. The apparatus according to claim 5, wherein the processing circuitry is configured to determine the information on the power level of received transmissions by averaging over multiple power level measurements of the respective frequency band.

9. The apparatus according to claim 5, wherein the processing circuitry is configured to perform the power level measurements to determine a power spectral density of the received transmissions in the plurality of frequency bands.

10. The apparatus according to claim 1, wherein the one or more power levels of the received transmissions in a frequency band comprise one or more of a power level at a noise floor of the frequency band, a power level indicative of a transmission by another cable modem, and a power level indicative of intermittent noise.

11. The apparatus according to claim 1, wherein at least the aggregation of the numeric information is triggered by the cable modem.

12. The apparatus according to claim 1, wherein at least the aggregation of the numeric information is triggered by a remote entity of the cable communication system.

13. The apparatus according to claim 1, wherein the processing circuitry is configured to obtain information on a subset of the plurality of frequency bands from the remote entity, and to aggregate the numeric information on the occurrence of the one or more power levels of the received transmissions by frequency band for the subset of the plurality of frequency bands.

14. The apparatus according to claim 1, wherein the aggregate numeric information comprises a histogram on the one or more power levels by frequency band for the plurality of frequency bands.

15. The apparatus according to claim 1, wherein two power levels are allocated to the same power level of the one or more power levels if a difference between the two power levels is at most a threshold value.

16. An apparatus for a cable communication system, the apparatus comprising:
interface circuitry for communicating with one or more cable modems of the cable communication system; and
processing circuitry configured to:
obtain, from a cable modem, for a plurality of frequency bands of an upstream spectrum, aggregate numeric information on the occurrence of one or more power levels of transmissions received by frequency band.

17. The apparatus according to claim 16, wherein the processing circuitry is configured to trigger the aggregation of the numeric information on the occurrence of one or more power levels of transmissions received by frequency band at the cable modem.

18. The apparatus according to claim 16, wherein the processing circuitry is configured to provide information on a subset of the plurality of frequency bands to the cable modem, wherein the aggregate numeric information on the occurrence of the one or more power levels of the received transmissions by frequency band is based on the subset of the plurality of frequency bands.

19. A method for a cable modem of a cable communication system, the method comprising:
determining information on a power level of received transmissions at a plurality of points in time in a plurality of frequency bands of an upstream spectrum via transceiving means of the cable modem;
determining, for each of the plurality of frequency bands, numeric information on an occurrence of one or more power levels of the received transmissions in the respective frequency band; and
aggregating the numeric information on the occurrence of the one or more power levels of the received transmissions by frequency band.

20. The method according to claim 19, wherein the method comprises counting a number of occurrences of the one or more power levels to determining the numeric information.

21. The method according to claim 19, wherein the method comprises:
comparing the numeric information one the occurrence of the one or more power levels to a numeric threshold, and
omitting the numeric information on a power level from the aggregate based on a comparison with the numeric threshold.

22. A method for a cable communication system, the method comprising:
obtaining, from a cable modem of the cable communication system, for a plurality of frequency bands of an upstream spectrum, aggregate numeric information on the occurrence of one or more power levels of transmissions received by frequency band.

23. The method according to claim 22, wherein the method comprises triggering the aggregation of the numeric information on the occurrence of one or more power levels of transmissions received by frequency band at the cable modem.

* * * * *